UNITED STATES PATENT OFFICE.

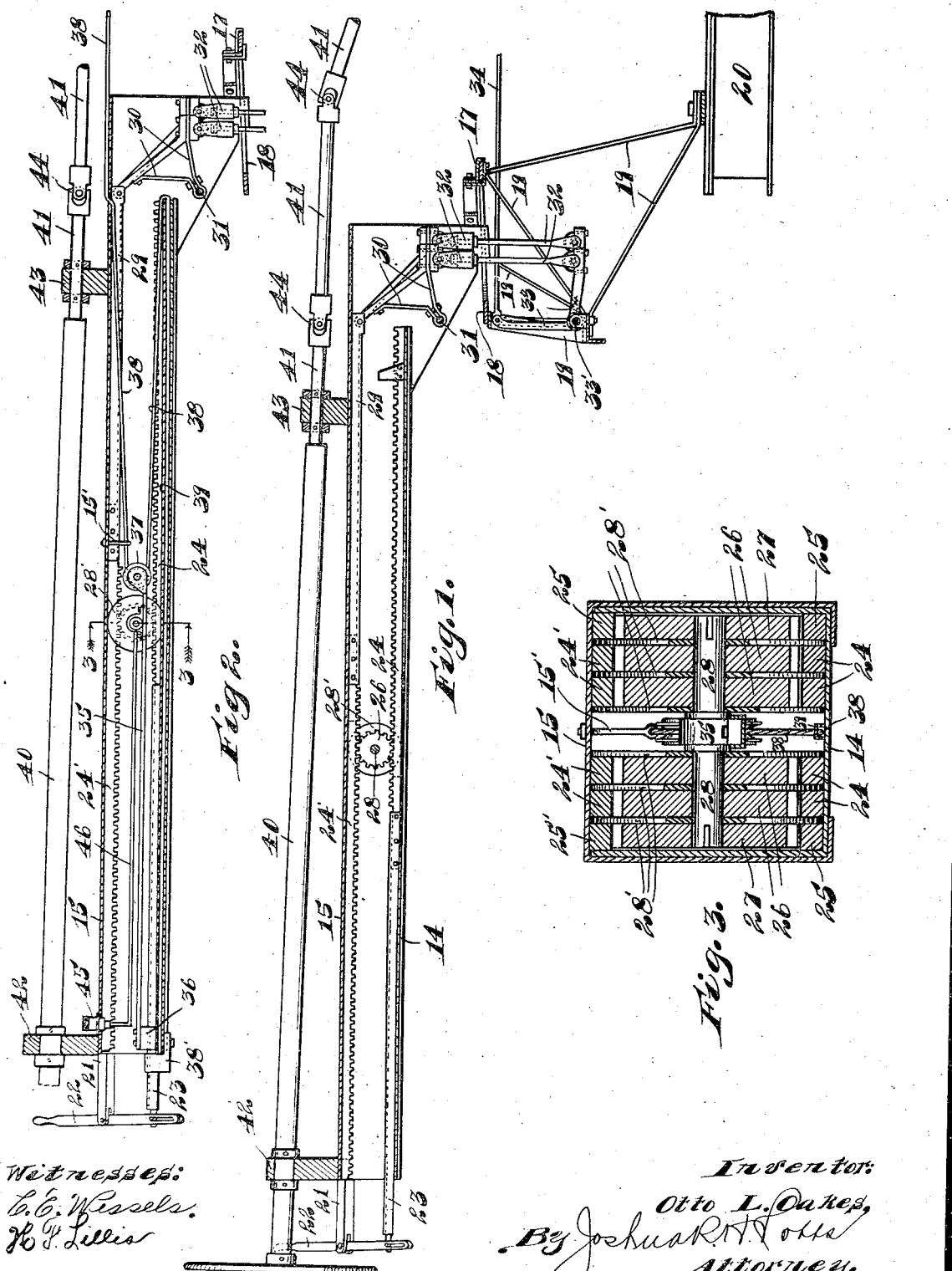

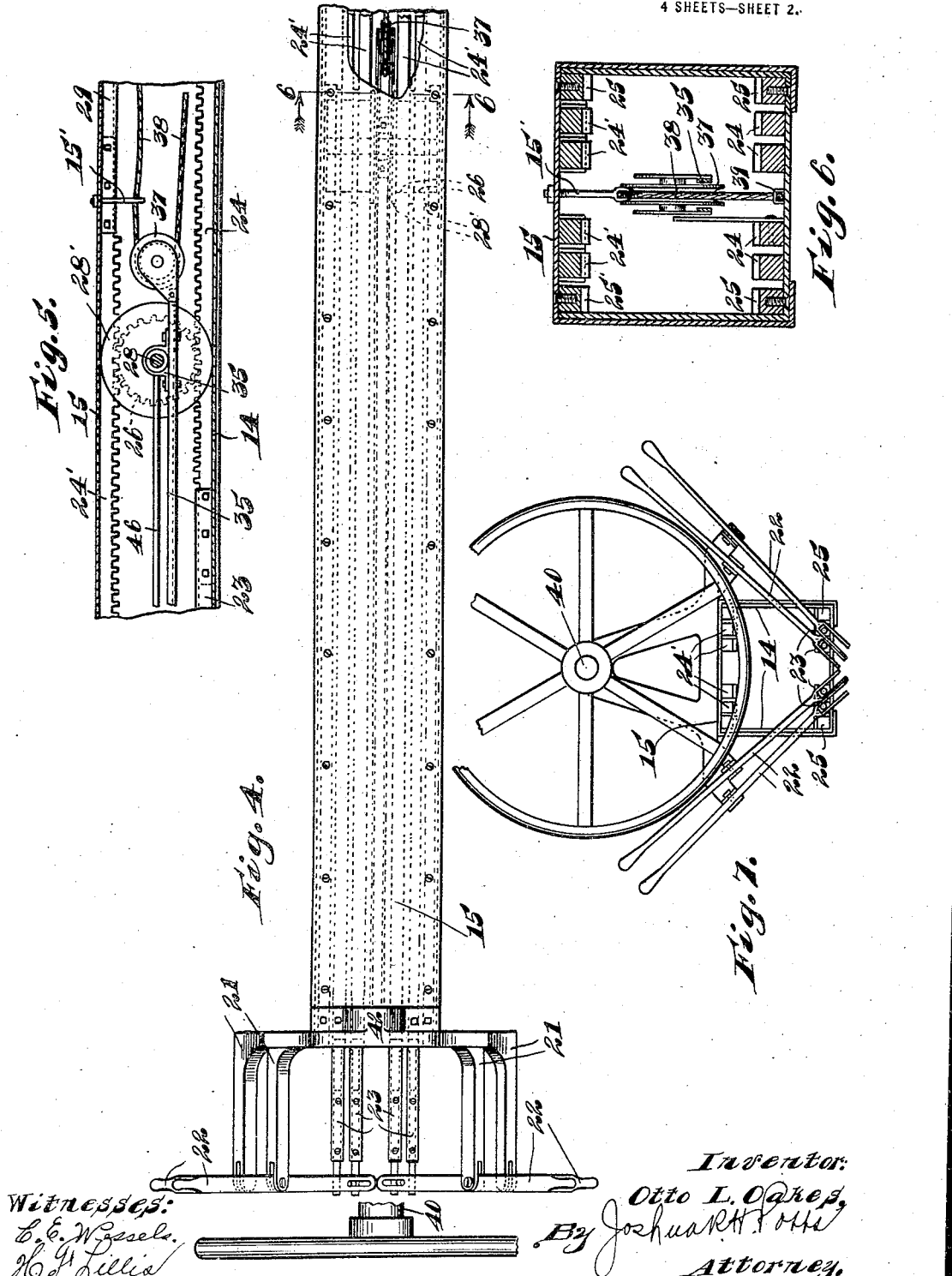

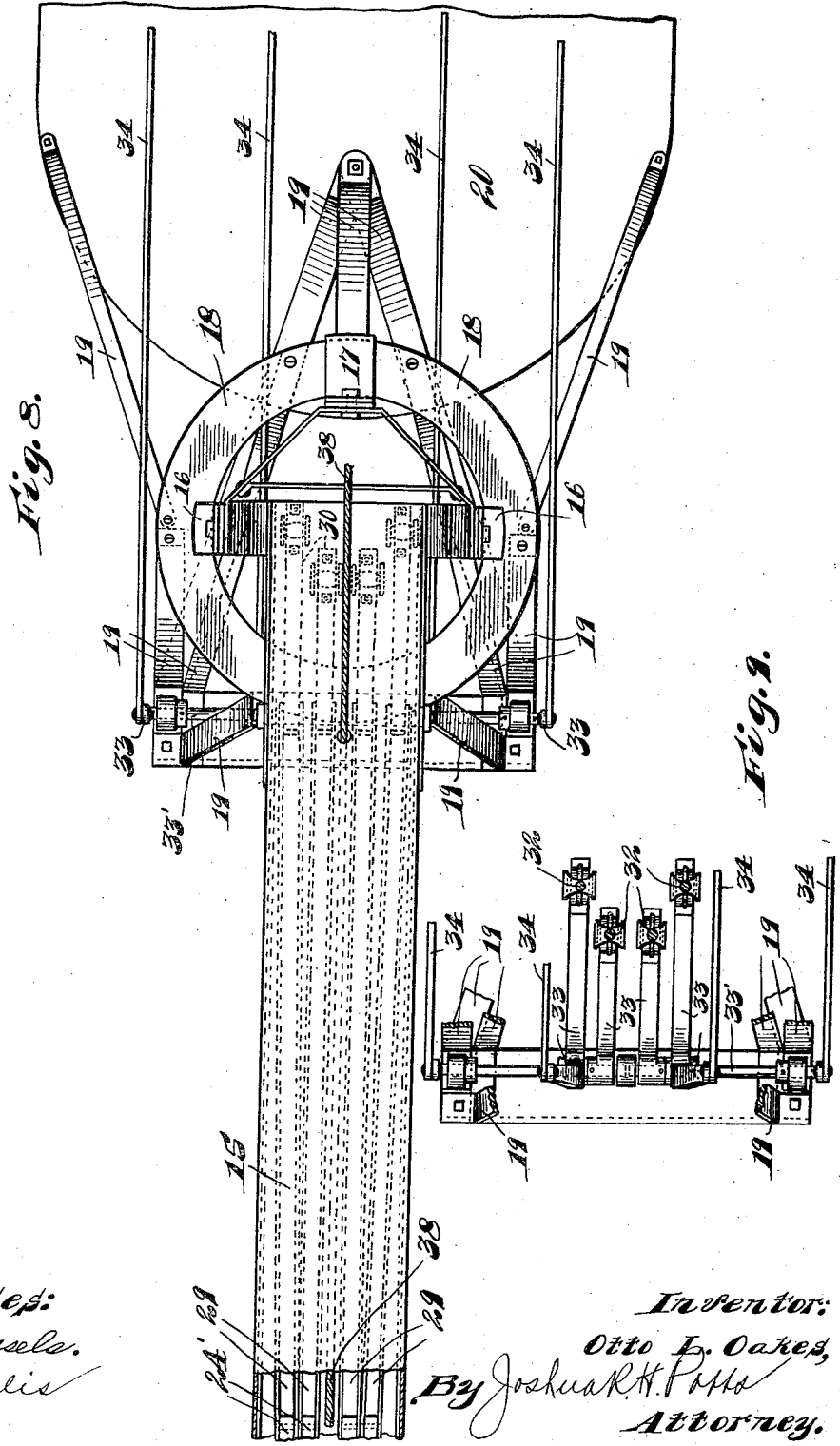

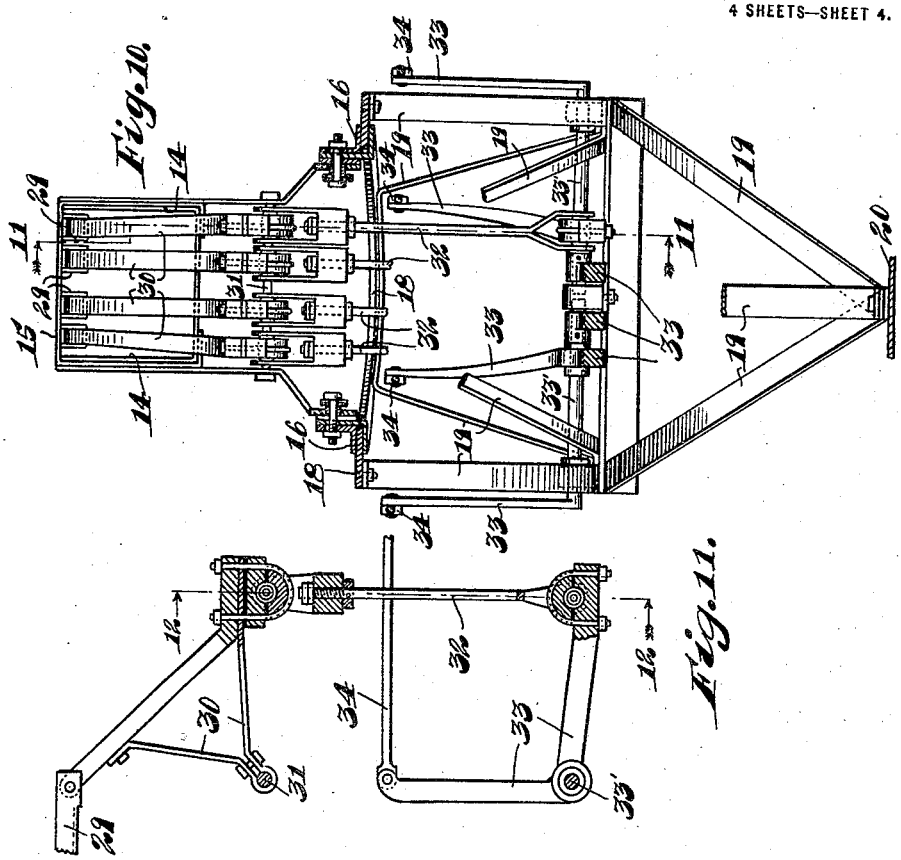

OTTO L. OAKES, OF BOISE, IDAHO.

TRACTOR-CONTROLLING MEANS AND THE LIKE.

1,414,988.  Specification of Letters Patent.  Patented May 2, 1922.

Application filed February 28, 1919. Serial No. 279,817.

*To all whom it may concern:*

Be it known that I, OTTO L. OAKES, a citizen of the United States, and a resident of the city of Boise, county of Ada, and State of Idaho, have invented certain new and useful Improvements in Tractor-Controlling Means and the like, of which the following is a specification.

My invention relates to improvements in tractor controlling means and the like, and has for its main object the provision of an improved arrangement and mechanism whereby the operator of a machine, such as a harvesting machine for instance, which is operated by means of a tractor or the like, may occupy the usual seat or position provided for the purpose on the machine for controlling the operation thereof, and also controlling, from the same position, the operations of the tractor, thus eliminating the necessity for the presence of another man on the tractor.

Other objects will appear hereinafter.

The invention consists in the combinations and arrangements of parts hereinafter described and claimed.

The invention will be best understood by reference to the accompanying drawings forming a part of this specification and in which, Fig. 1, is a longitudinal section of a mechanism or arrangement embodying the invention, Fig. 2, a partial similar view, on a smaller scale, taken in part on a different vertical plane, Fig. 3, an enlarged section taken on line 3—3 of Fig. 2, Fig. 4, a top plan view of the rear portion of said mechanism, Fig. 5, a detail view of the central portion of said mechanism, Fig. 6, an enlarged section taken on line 6—6 of Fig. 4, Fig. 7, a rear elevation of the mechanism, Fig. 8, a top plan view, corresponding with Fig. 4, and showing the forward portion of the mechanism, Fig. 9, a detail horizontal section through the forward portion of the mechanism, Fig. 10, a vertical section through the forward portion of the mechanism, Fig. 11, a section taken on line 11—11 of Fig. 10, Fig. 12, a section taken on line 12—12 of Fig. 11, and Fig. 13, a detail view of a slightly modified form of construction for operating the mechanism.

The preferred form of construction, as illustrated in the drawings, comprises two housings 14 and 15 made of sheet metal, substantially square in cross section and telescoping one with the other. The rear end of the lower housing 14 is suitably mounted or attached in any convenient manner to the harvesting machine itself, in convenient and operative relation with the seat of the operator, and the forward end of the upper housing 15 is likewise connected or attached to the rear end of the frame of the tractor itself, the longitudinal extension permitted by the telescoping of the housings 14 and 15 permitting of adjustments of the device to fit varying relations and conditions of coupling between the tractor and the machine. The forward portion of the housing 15 carries shoes 16 and 17 slidably engaging an annular supporting ring 18, suitably mounted on brackets 19 supported on the frame 20 of the tractor, the ring 18 being arranged above and co-axially with the usual pivotal coupling between the tractor and the machine which it is arranged to draw and operate, as will be readily understood.

A supporting head 21 is secured to the rear end of the housing 14, and is in turn suitably supported in any desired manner on the machine, said head carrying a plurality of operating levers 22, there being four of these operating levers in the instance or example illustrated. Each of these levers is suitably connected by a link 23 with a corresponding rack bar 24 slidably mounted on the bottom of the housing 14, and a similar rack bar 25 is arranged at each side of the bottom of the housing 14, as shown. Four gears 26 are arranged to ride or roll upon the rack bars 24, and similar gears 27 are arranged to ride or roll upon the rack bars 25, a shaft 28 being extended co-axially through all of said gears, and the gears 27 being fixed or keyed to the ends of said shaft, as indicated. Suitable washers or distancing plates 28', of diameters substantially equal to the clear space between the top of housing 15 and the bottom of housing 14, are loosely mounted on shaft 28 and serve to distance said gears and rack bars and hold them in place. Corresponding rack bars 24' and 25' are arranged at the top of housing 15 and meshing, respectively, with the gears 26 and 27, as best shown in Fig. 3. The rack bars 25 are fixed in the housing 15, but the rack bars 24' are slidable therein and are connected by bars or links 29 with bell cranks 30 mounted on a rod or shaft 31 at the forward end of housing 15, as shown. The other arms of the bell cranks 30 are connected by links 32 with the corresponding arms of bell cranks 33, which is suitably mounted on a shaft or rod 33' mounted in the framework 19, as shown, the links 32 being arranged concentrically around the axis of supporting plate 18 and having ball and socket joint connections with said bell cranks, as indicated. Each of the bell cranks 33 is connected by a forwardly extending link or rod 34 with the corresponding means for controlling the tractor, such as the brake, clutch, spark and throttle mechanism thereof, and whereby the operation of the tractor may be readily controlled, as will be readily understood. By this arrangement it will be observed that by manipulating the corresponding levers 22 the corresponding bell cranks 33 and the corresponding control rods 34 may be correspondingly manipulated to adjust and operate the corresponding controlling mechanisms of the tractor. The arrangement is such as to permit of extensions or contractions of the combined lengths of the housings 14 and 15 either in adjusting the mechanism to position, or during the operation of the tractor and machine, longitudinal sliding of either of the rack bars 24 producing corresponding longitudinal sliding, in a reverse direction, of the corresponding rack bars 24', irrespective of whether the shaft 28 is held stationary or is in motion. Likewise, the connections between the bell cranks 30 and 33, and the mounting of the forward portion of the housing 15 is such as to permit of the transmission of this motion, notwithstanding angular or pivotal variations between the tractor and the machine it is drawing. It will be observed that the plate or support 18 is arranged in an inclined position so as to effect depression or elevation of the forward end of the housing 15 upon pivotal movement, and this elevation or depression is properly proportioned to compensate for the variation produced by the pivotal movement.

A carriage 35 is pivotally mounted adjacent its forward end on the shaft 28, and is provided at its rearward end with a shoe 36 slidable upon the bottom of housing 14, a grooved pulley 37 being mounted in the forward portion of said carriage, as shown. A flexible electric cord or cable 38 is run from an electric control box 38' at the rear of housing 14, forwardly through a suitable conduit 39 located centrally in the lower portion of housing 14, thence rearwardly over pulley 37, thence forwardly through a hanger 15' depending from the top of housing 15, and then projecting through a suitable opening in the top of said housing, as indicated, and whereby electrical connections may be easily effected, as will be readily understood, between the machine and the tractor, the pulley 37 serving to take up slack in the cable 38 during the various adjustments of movements between the housings 14 and 15.

A suitable oil or grease cup 45 is provided at the rear of housing 15 and is connected by a telescoping pipe 46 with the bearing or shaft 28 in the carriage 35, and whereby oil is conducted to said shaft.

In Fig. 13 I have illustrated a slightly modified form of construction and mounting of the operating levers arranged at the rear of the housing 14. Here each lever 47 is pivotally connected with the rear of the corresponding bar or link 23, and is connected by link 48 with the housing 14 by another link 49 with a foot lever 50, and whereby the various adjustments may be readily made, either by hand or foot, such an arrangement being especially adapted for use in conjunction with the levers controlling the clutch and brake of the tractor.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. The combination with a machine and tractor for moving the same, of a rack bar attached to said machine; a gear operating on said rack bar; a rack bar attached to said tractor and operating on said gear; a shaft carried by said gear; a second gear on said shaft; a second pair of rack bars slidable longitudinally with respect to said first mentioned rack bars and meshing with opposite sides of said second gear, one of said second pair of rack bars leading to said machine and the other leading to said tractor; means on the machine for operating the said rack bar leading thereto; and controlling means on said tractor operatively connected with the said rack bar leading thereto, substantially as described.

2. The combination with a machine and tractor for moving the same, of a rack bar attached to said machine; a gear operating on said rack bar; a rack bar attached to said tractor and operating on said gear; a shaft carried by said gear; a second gear on said shaft; a second pair of rack bars slidable longitudinally with respect to said first mentioned rack bars and meshing with opposite sides of said second gear, one of said second pair of rack bars leading to said machine and the other leading to said tractor; means on the machine for operating the said rack bar leading thereto; and controlling means on said tractor operatively connected with the said rack bar leading thereto, said operative connection permitting of pivotal movement between said machine and tractor, substantially as described.

3. The combination with a machine and tractor for moving the same, of two telescoping housings, one of said housings being attached at one end to said machine, and the other of said housings being attached at the opposite end to said tractor; opposed rack bars in said housing; a gear interposed between said rack bars; a shaft carried by said gear; a second gear on said shaft; a second pair of opposed rack bars slidable longitudinally with respect to said housings and meshing with opposite sides of said second gear, one of said second pair of rack bars leading to said machine and the other leading to said tractor; means on the machine for operating the said rack bar leading thereto; and controlling means on said tractor operatively connected with said rack bar leading thereto, substantially as described.

4. The combination with a machine and tractor for moving the same, of two telescoping housings, one of said housings being attached at one end to said machine, and the other of said housings being attached at the opposite end to said tractor; opposed rack bars in said housing; a gear interposed between said rack bars; a shaft carried by said gear; a second gear on said shaft; a second pair of opposed rack bars slidable longitudinally with respect to said housings and meshing with opposite sides of said second gear, one of said second pair of rack bars leading to said machine and the other leading to said tractor; means on the machine for operating the said rack bar leading thereto; and controlling means on said tractor operatively connected with said rack bar leading thereto, said operative connection permitting of pivotal movement between said machine and tractor, substantially as described.

5. The combination with a machine and tractor for moving the same, of two telescoping housings, one of said housings being attached at one end to said machine, and the other of said housings being attached at the opposite end of said tractor; opposed rack bars in said housing; a gear interposed between said rack bars; a shaft carried by said gear; a second gear on said shaft; a second pair of opposed rack bars slidable longitudinally with respect to said housings and meshing with opposite sides of said second gear, one of said second pair of rack bars leading to said machine and the other leading to said tractor; means on the machine for operating the said rack bar leading thereto; controlling means on said tractor operatively connected with said rack bar leading thereto; and a telescoping steering shaft for said tractor mounted on said housing and having two universal joints therein, substantially as described.

6. The combination with a machine and tractor for moving the same, of two telescoping housings, one of said housings being attached at one end to said machine, and the other of said housings being attached at the opposite end to said tractor; opposed rack bars in said housing; a gear interposed between said rack bars; a shaft carried by said gear; a second gear on said shaft; a second pair of opposed rack bars slidable longitudinally with respect to said housings and meshing with opposite sides of said second gear, one of said second pair of rack bars leading to said machine and the other leading to said tractor; means on the machine for operating the said rack bar leading thereto; controlling means on said tractor operatively connected with said rack bar leading thereto, said operative connection permitting of pivotal movement between said machine and tractor; and a telescoping steering shaft for said tractor mounted on said housing and having two universal joints therein, substantially as described.

7. The combination with a machine and a tractor for moving the same, of two telescoping housings, one mounted at one end on said machine and the other mounted at its other end on said tractor; opposed pairs of rack bars fixed in said housings; gears operating between said opposed pairs of rack bars; a shaft carried by said gears; opposed pairs of rack bars slidable in said housings; gears on said shaft operating between said opposed pairs of sliding rack bars; rings loosely mounted on said shaft for spacing said gears and rack bars and holding same in position in said housings; means on the machine for operating the said slidable rack bars carried by the housings mounted on said machine; tractor controlling means on said tractor; and operative connections between said tractor controlling means and the slidable rack bars carried by the housings mounted on said tractor, substantially as described.

8. The combination with a machine and tractor for moving the same, of a rack bar attached to said machine; a gear operating on said rack bar; a rack bar attached to said tractor and operating on said gear; a shaft carried by said gear; a second gear on said shaft; a second pair of rack bars slidable longitudinally with respect to said first mentioned rack bars and meshing with opposite sides of said second gear, one of said second pair of rack bars leading to said machine and the other leading to said tractor; means on the machine for operating the said rack bar leading thereto; controlling means on said tractor operatively connected with the said rack bar leading thereto; a pulley carried by said shaft; and a flexible electric coil attached to said housing and passing over said pulley, substantially as described.

9. The combination with a machine and tractor for moving the same, of two telescoping housings, one of said housings being attached at one end to said machine, and the other of said housings being attached at the opposite end to said tractor; opposed rack bars in said housing; a gear interposed between said rack bars; a shaft carried by said gear; a second gear on said shaft; a second pair of opposed rack bars slidable longitudinally with respect to said housings and meshing with opposite sides of said second gear, one of said second pair of rack bars leading to said machine and the other leading to said tractor; means on the machine for operating the said rack bar leading thereto; controlling means on said tractor operatively connected with said rack bar leading thereto; a telescoping steering shaft for said tractor mounted on said housing and having two universal joints therein; a pulley carried by said shaft; and a flexible electric coil attached to said housings and passing over said pulley, substantially as described.

10. The combination with a machine and a tractor for moving the same; two telescoping housings, one mounted at one end on said machine and the other mounted at its other end on said tractor, the mounting on said tractor permitting of pivotal and vertical movement; a rack bar attached to the housing attached to said machine; a gear operating on said rack bar; a rack bar attached to the housing attached to said tractor and operating on said gear; a shaft carried by said gear; a second gear on said shaft; a second pair of rack bars slidable longitudinally with respect to said housings and meshing with said second gear, one of said second pair of rack bars leading to said machine and the other leading to said tractor; means on the machine for operating the said rack bar leading thereto; and controlling means on said tractor operatively connected with said rack bar leading thereto, substantially as described.

11. In a mechanical movement comprising telescopic housings; opposed longitudinally shiftable rack bars mounted in said housings; a gear operating between said rack bars; a shaft carried by said gear; a pair of opposed longitudinally slidable rack bars in said housings; a gear on said shaft operating between said slidable rack bars; and means for transmitting motion through said slidable rack bars and at the same time permitting telescopic movement of said housings, substantially as described.

In testimony whereof I have signed my name to this specification in the presence of two subscribing witnesses.

OTTO L. OAKES.

Witnesses:
JOSHUA R. H. POTTS,
HELEN F. LILLIS.